United States Patent
Nishihara et al.

(10) Patent No.: US 8,590,482 B2
(45) Date of Patent: Nov. 26, 2013

(54) CONVEYING APPARATUS FOR DIPPING WORKPIECES INTO A TREATMENT BATH

(75) Inventors: Shigeyoshi Nishihara, Shiga (JP); Hirohito Takeichi, Shiga (JP)

(73) Assignee: Daifuku Co., Ltd., Osaka-shi, Osaka (JP)

( * ) Notice: Subject to any disclaimer, the term of this patent is extended or adjusted under 35 U.S.C. 154(b) by 162 days.

(21) Appl. No.: 13/175,141

(22) Filed: Jul. 1, 2011

(65) Prior Publication Data

US 2012/0006261 A1  Jan. 12, 2012

(30) Foreign Application Priority Data

Jul. 6, 2010  (JP) .................................. 2010-154020

(51) Int. Cl.
| | |
|---|---|
| B05C 3/00 | (2006.01) |
| B05C 19/02 | (2006.01) |
| B65G 47/10 | (2006.01) |
| B65G 47/46 | (2006.01) |
| B65G 47/34 | (2006.01) |
| B05D 1/18 | (2006.01) |

(52) U.S. Cl.
USPC ........... 118/425; 118/400; 118/423; 118/426; 198/370.02; 198/468.9; 427/430.1; 427/435; 414/222.01

(58) Field of Classification Search
USPC ..................... 118/400, 423, 426; 414/222.01; 427/430.1, 435
See application file for complete search history.

(56) References Cited

U.S. PATENT DOCUMENTS

| | | |
|---|---|---|
| 6,419,983 B1 | 7/2002 | Kreuzer |
| 6,676,755 B2 | 1/2004 | Ehrenleitner et al. |
| 6,706,117 B2 | 3/2004 | Ehrenleitner et al. |
| 7,383,939 B2 | 6/2008 | Kreuzer et al. |
| 2003/0097982 A1 | 5/2003 | Ehrenleitner et al. |
| 2008/0247847 A1 | 10/2008 | Muller et al. |

FOREIGN PATENT DOCUMENTS

JP  2008 100223  5/2008

*Primary Examiner* — Dah-Wei Yuan
*Assistant Examiner* — Karl Kurple
(74) *Attorney, Agent, or Firm* — Dickinson Wright PLLC

(57) ABSTRACT

A traveling type dipping apparatus in a painting system of a vehicle body of an automobile, usable as mechanism to rotate and dip the vehicle body having been supported on a conveying traveling body horizontally in a forward facing direction in a treatment liquid while conveying the vehicle body.

4 Claims, 12 Drawing Sheets

CONVEYING APPARATUS FOR DIPPING WORKPIECES INTO A TREATMENT BATH

CROSS REFERENCE TO RELATED APPLICATION

This utility patent application claims the priority of JP 2010-154020 filed on Jul. 6, 2010, entitled "Traveling Type Dipping Apparatus," the entire disclosure of the application being considered part of the disclosure of this application and hereby incorporated by reference.

TECHNICAL FIELD

The present invention relates to a traveling type dipping apparatus for a vehicle body of an automobile.

BACKGROUND OF THE INVENTION

There has been known a traveling type dipping apparatus including a conveying traveling body traveling along a dip treatment bath, a rotation shaft provided to the conveying traveling body and crossing above the dip treatment bath horizontally, rotation shaft driving mechanism provided to the conveying traveling body and rotationally driving the rotation shaft, and workpiece support provided to the rotation shaft, wherein a workpiece to be treated having been supported by the workpiece support can be dipped in the dip treatment bath by rotation of the rotation shaft, as described in Japanese Patent Application No. 2008-100223.

SUMMARY OF THE INVENTION

When this kind of traveling type dipping apparatus is used in a painting system for a vehicle body of an automobile, a long and large-sized vehicle body is rotated about the rotation shaft placed below the vehicle body while supported with a length direction thereof parallel to a conveyance direction, as conventionally known. Thus, a rotation track of the vehicle body when rotated in order to be dipped in the dip treatment bath projects more forward and rearward than positions of front and rear ends of the vehicle body when supported by the conveying traveling body. Consequently, to prevent a rotating vehicle body from interfering with vehicle bodies supported by preceding and following conveying traveling bodies, a pitch between the conveying traveling bodies needs to be broadened considerably as compared with an entire length of the vehicle body. As a result, not only is conveyance efficiency reduced but also an entire length of the dip treatment bath is increased, whereupon equipment expense and running costs increase.

Accordingly, the present invention proposes a traveling type dipping apparatus capable of solving the above-described conventional problems. A traveling type dipping apparatus according to the first aspect of the present invention, described with reference symbols in parentheses used in the detailed description of an embodiment described below in order to facilitate understanding of the relationship with the embodiment, includes a conveying traveling body (1) traveling along a dip treatment bath (2), a rotation shaft (11) provided to the conveying traveling body (1) and crossing above the dip treatment bath (2) horizontally, rotation shaft driving mechanism (16) provided to the conveying traveling body (1) and rotationally driving the rotation shaft (11), and a workpiece support (15) provided to the rotation shaft (11), wherein a workpiece to be treated (W) having been supported by the workpiece support (15) can be dipped in the dip treatment bath (2) by rotation of the rotation shaft (11), and the apparatus further includes a movable base (5) provided on the conveying traveling body (1), being reciprocable in a back and forth direction of a traveling direction of the conveying traveling body (1), and supporting the rotation shaft (11), and movable base driving mechanism (20) making the movable base (5) reciprocate back and forth with respect to the conveying traveling body (1).

In carrying out the present invention, more specifically as described in the second aspect, the movable base driving mechanism (20) can be constituted by a revolving arm (21) supported on the movable base (5) and rotating about a horizontal axis parallel to the rotation shaft (11) in synchronization with the rotation shaft (11) and a rotation to rectilinear reciprocation converting mechanism (22) to convert one rotational movement of the revolving arm (21) into one reciprocal movement of the movable base (5) with respect to the conveying traveling body (1). As the rotation to rectilinear reciprocation converting mechanism (22) required in this case, a variety of configurations are conceivable such as a configuration of coupling, by a spindle, a free end of the revolving arm (21) and a free end of a long link pivotally supported at a fixed position on the conveying traveling body (1) away in the back and forth direction with respect to a rotation space of the revolving arm (21). However, it is preferable to use the rotation to rectilinear reciprocation converting mechanism (22) constituted by a guide rail (23) mounted to the conveying traveling body (1) in a vertical up/down direction so as to adjoin the revolving arm (21) and an elevating member (24) attached to a free end of the revolving arm (21) and elevatably engaged with the guide rail (23) as described in the third aspect.

Further, not the movable base driving mechanism (20) composed of the revolving arm (21) and the rotation to rectilinear reciprocation converting mechanism (22) as described above, but movable base driving mechanism (31) provided with a driving rotating body (a chain, a belt, a wire rope, a pinion gear meshed with a rack gear, etc.) (30) driven by another motor (29) separate from a motor (18) of the rotation shaft driving mechanism (16) can be used as the movable base driving mechanism, as described in the fourth aspect.

When a workpiece, for example, a vehicle body of an automobile having been supported by the workpiece support is rotated in a front lowered direction by driving the rotation shaft at a fixed position on the conveying traveling body in order to be dipped in the dip treatment bath, a front end position of the vehicle body while rotating projects more forward than a front end position of the vehicle body while horizontally supported above the rotation shaft at the fixed position. According to the configuration of the first aspect of the present invention, however, the position of the rotation shaft is moved rearward on the conveying traveling body by operating the movable base driving mechanism as much as the front end position of the rotating vehicle body projects forward. When the rotating vehicle body rotates from a vertical posture toward a horizontal upside down posture, the position of the rotation shaft is moved forward on the conveying traveling body and returned to its original position. Further, when the rotating vehicle body upwardly rotates from the horizontal upside down posture toward the vertical posture, the position of the rotation shaft is moved forward from its original position on the conveying traveling body as much as the front end position of the rotating vehicle body projects rearward. At the final stage where the rotating vehicle body rotates from the vertical posture toward its original horizontally supported posture, the position of the rotation shaft is moved rearward on the conveying traveling body and returned to its original position. In such a manner, the movable base is moved back and forth, whereby the forward and rearward projections of the rotation track of the vehicle body when viewed from the conveying traveling body can almost be eliminated.

More specifically, according to the configuration of the present invention, the forward and rearward projections of the rotation track of the vehicle body when viewed from the conveying traveling body can almost be eliminated by moving the movable base which supports the rotation shaft, back and forth by the movable base driving mechanism depending on changes in rotation angle of the rotation shaft (vehicle body). As a result, such a constraint that a pitch between conveying traveling bodies must be broadened considerably compared with an entire length of the vehicle body in order to prevent the rotating vehicle body from interfering with vehicle bodies supported by the preceding and following conveying traveling bodies as in the conventional manner is eliminated. Accordingly, not only can the pitch between the conveying traveling bodies be reduced to enhance the conveying efficiency but also an entire length of the dip treatment bath can be shortened to achieve reductions in equipment expense and running costs.

It is noted that when the movable base driving mechanism is configured as described in the second aspect, the essential driving source for the rotation shaft driving mechanism is used as a driving source for reciprocation of the movable base, too. Thus, the equipment expense and running costs can further be reduced as compared with the case of requiring a driving source such as a motor dedicated for the movable base driving mechanism. According to the configuration as described in the third aspect, the entire length of the conveying traveling body can be kept to a minimum sufficient to ensure the back and forth reciprocating path of the movable base as compared with the configuration of requiring a horizontal long link at the front or the rear of the revolving arm.

As a matter of course, the movable base driving mechanism can be configured as described in the fourth aspect, thereby allowing for simplification of the configuration on the conveying traveling body.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
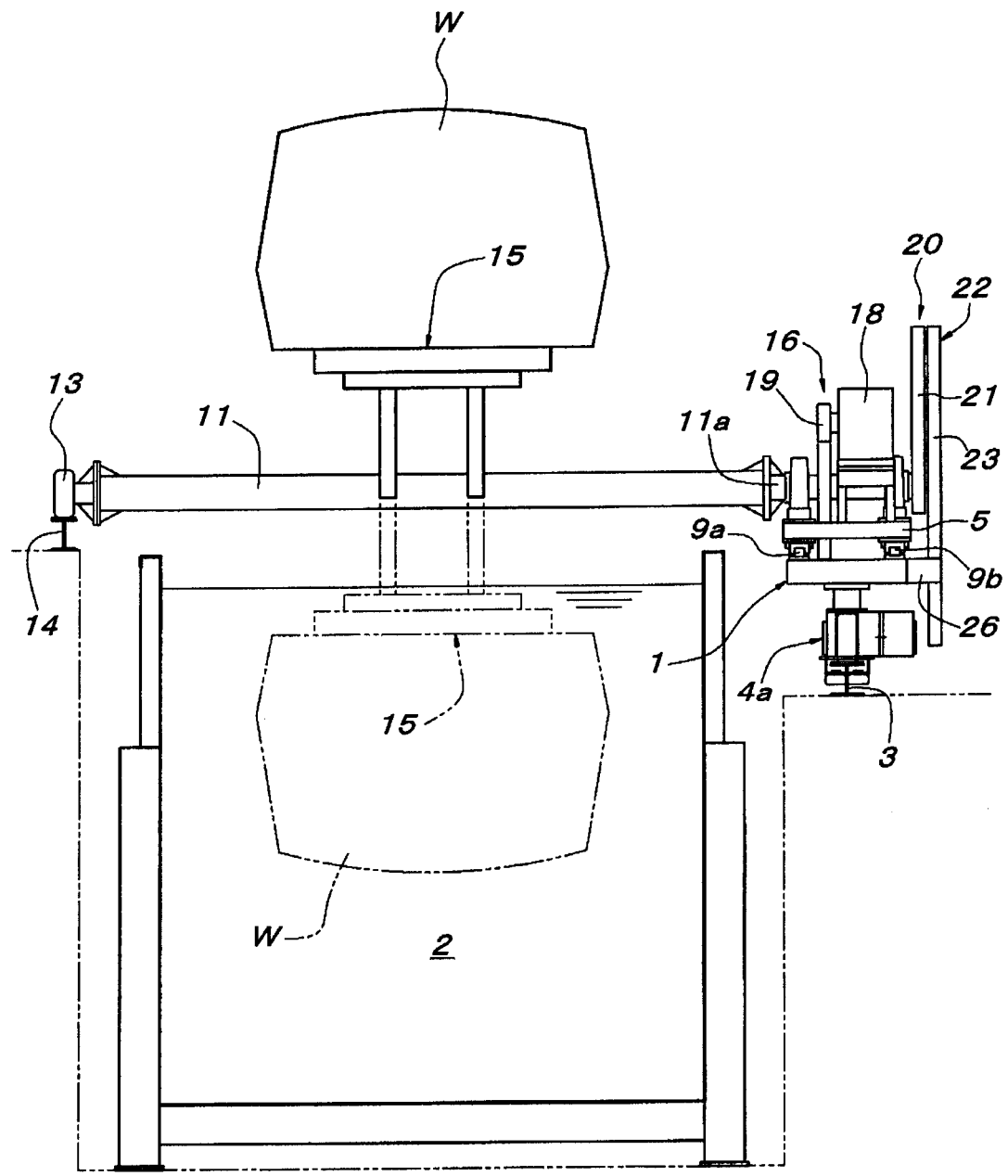
FIG. 1 is a partial longitudinal sectional front view showing one embodiment of the present invention.

One embodiment of the present invention will be described based on FIGS. 1 to 5. Reference symbol 1 denotes a conveying traveling body. Reference symbol 2 denotes a dip treatment bath, which is arranged along a traveling path of the conveying traveling body 1. The conveying traveling body 1 includes a pair of front and rear carriages 4a and 4b on the underside of front and rear ends thereof, and the carriages 4a and 4b are engaged with one guide rail 3 laid on the traveling path of the conveying traveling body 1. The conveying traveling body 1 includes a movable base 5 on the upper side thereof. Both front and rear carriages 4a and 4b are mounted rotatably about a vertical axis with respect to the conveying traveling body 1 and respectively include a supporting wheel 6 rolling on an upper horizontal rail of the guide rail 3 using H-section steel and a pair of right and left posture controlling rollers 7 at the front and the rear thereof sandwiching a vertical plate of the guide rail 3 and being rotatable about the vertical axis, as shown in FIG. 5. The front carriage 4a is provided with a speed reducer equipped motor 8 rotationally driving the supporting wheel 6 thereof. Therefore, the conveying traveling body 1 can be traveled forward along the guide rail 3 by operating the speed reducer equipped motor 8 of the carriage 4a to rotationally drive the supporting wheel 6. The conveying traveling body 1 can travel even on a horizontal curve portion of the path smoothly due to the rotation of respective carriages 4a and 4b about the vertical axis with respect to the conveying traveling body 1.

The movable base 5 includes slide guides 10 at four corners of the bottom thereof respectively, and the slide guides 10 are fitted to a pair of right and left slide guide rails 9a and 9b laid on the conveying traveling body 1 in parallel with the traveling direction thereof. The movable base 5 is supported longitudinally reciprocably, parallel to the traveling direction of the conveying traveling body 1. A driving shaft 11a is self-rotatably supported by a pair of right and left bearings 12a and 12b on the upper side of the movable base 5. The driving shaft 11a has one end concentrically connected with a horizontal rotation shaft 11 crossing above the dip treatment bath 2 arranged at a lateral side of the traveling path of the conveying traveling body 1. The rotation shaft 11 has a free end attached with a guide roller 13 via which a guide rail 14 for supporting the rotation shaft 11 horizontally is laid outside the dip treatment bath 2 and on the opposite side of the traveling path of the conveying traveling body 1. At a longitudinally central portion of the rotation shaft 11, that is, at a position of an upper side of a width-direction central portion of the dip treatment bath 2, there is mounted workpiece support 15 to support a vehicle body W of an automobile which is a workpiece to be treated, in such a manner that a longitudinal direction of the vehicle body W becomes parallel to the traveling direction of the conveying traveling body 1. Although a detailed structure is not shown, the workpiece support 15 can fix the vehicle body W firmly into a state that the supported vehicle body W can safely be rotated about the rotation shaft 11 by rotation of the rotation shaft 11 as conventionally known.

Figure 4:
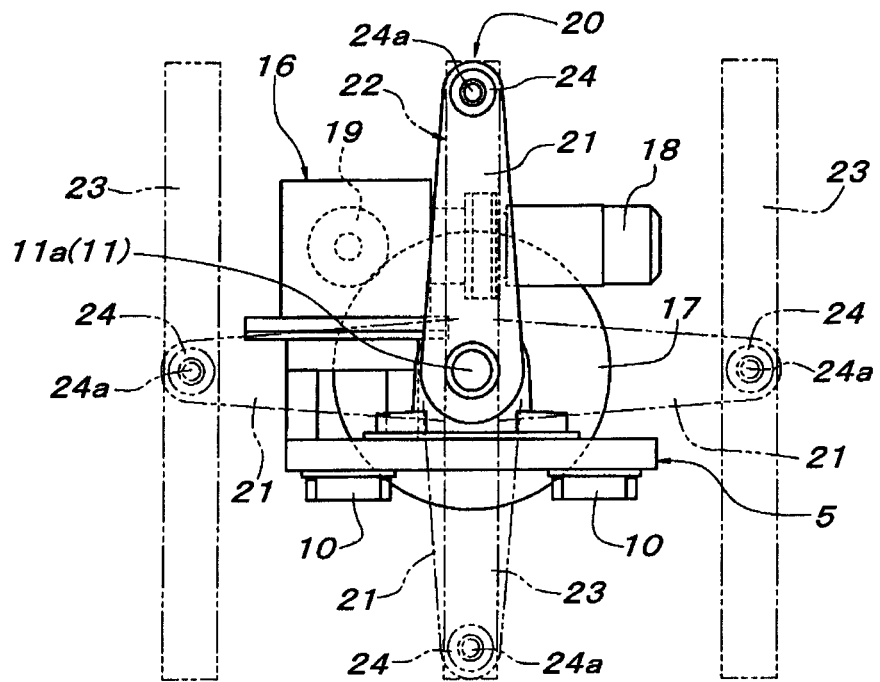
FIG. 4 is a side view showing a configuration on a movable base.
Figure 5:
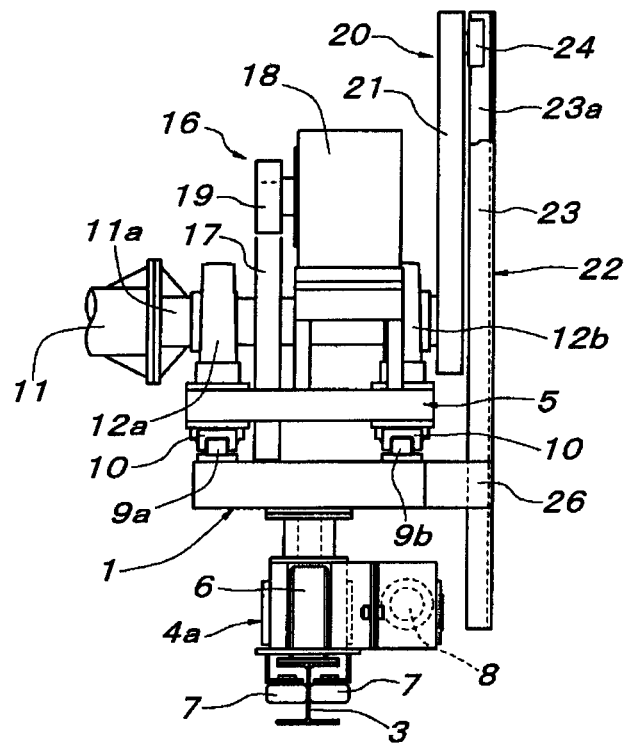
FIG. 5 is an enlarged front view of a main part of FIG. 1.

As shown in FIG. 4 and FIG. 5, the rotation shaft 11 is rotationally driven by the rotation shaft driving mechanism 16. The rotation shaft driving mechanism 16 is composed of a large diameter spur gear 17 mounted to the driving shaft 11a at an intermediate position between the paired right and left bearings 12a and 12b, a speed reducer equipped motor 18 placed on the movable base 5, and a small diameter spur gear 19 mounted to an output shaft of the speed reducer equipped motor 18 and meshed with the large diameter spur gear 17.

The movable base 5 is caused to reciprocate back and forth by movable base driving mechanism 20. The movable base driving mechanism 20 is composed of a revolving arm 21 fixed to a free end of the driving shaft 11a at a right angle, and a rotation to rectilinear reciprocation converting mechanism 22 to convert one rotational movement of the revolving arm 21 to one reciprocating movement of the movable base 5 with respect to the conveying traveling body 1. The rotation to rectilinear reciprocation converting mechanism 22 is composed of a vertical up/down direction guide rail 23 fixed on a lateral part of the conveying traveling body 1 so as to adjoin outside a rotation track of the revolving arm 21, and an elevating member 24 mounted to a free end of the revolving arm 21 and elevatably engaged with the guide rail 23. More specifically, the guide rail 23 includes a channel bar with a groove 23a positioned on the side of the revolving arm 21. The elevating member 24 includes a roller pivotally supported by a spindle 24a parallel to the driving shaft 11a and freely rotatably, elevatably fitted inside the groove of the guide rail 23. The guide rail 23 has such a vertical length that the elevating member (roller) 24 is not detached from upper and lower ends thereof when the revolving arm 21 makes one turn. An intermediate position of the guide rail 23 is attached to the conveying traveling body 1 by a supporting member 26 which forms a rotation space 25 of the revolving arm 21 between a lateral face of the conveying traveling body 1 and itself, as shown in FIG. 2.

Figure 2:
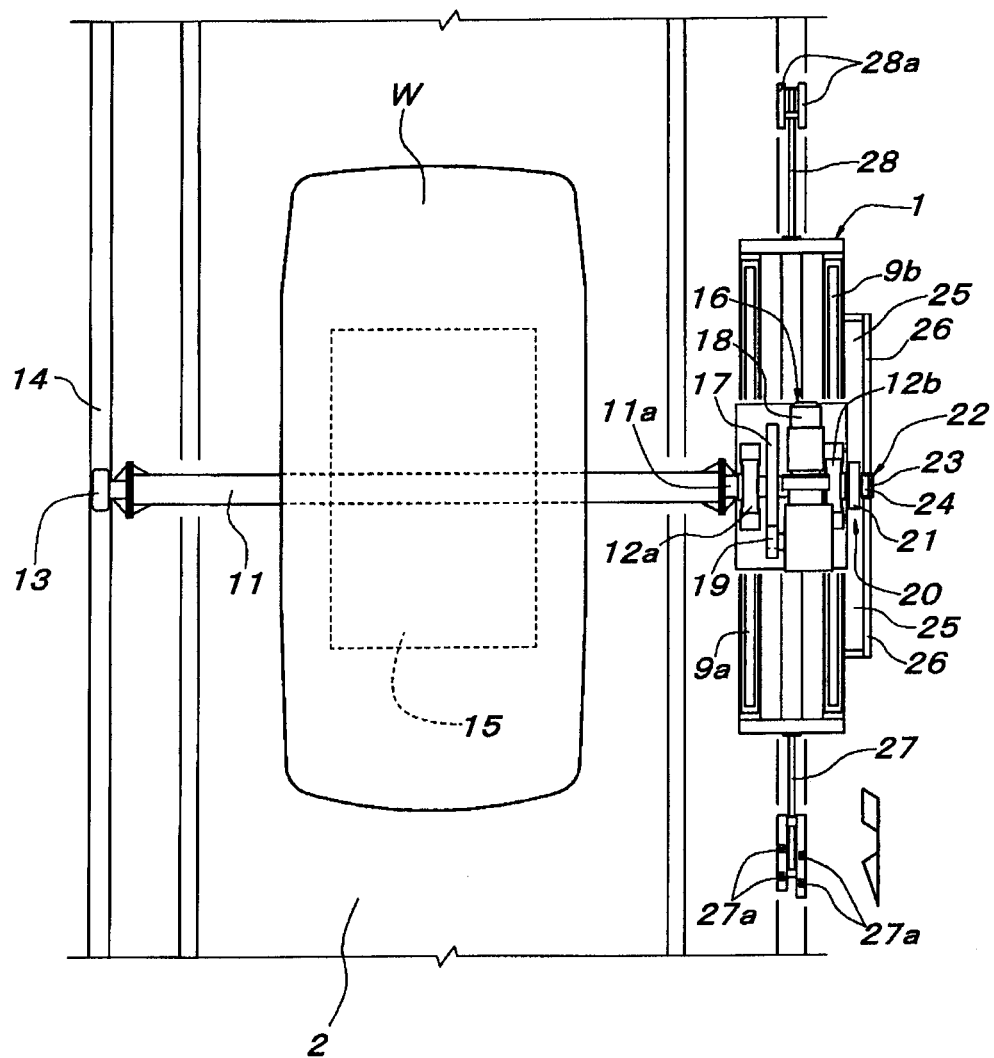
FIG. 2 is a plan view thereof.
Figure 3:
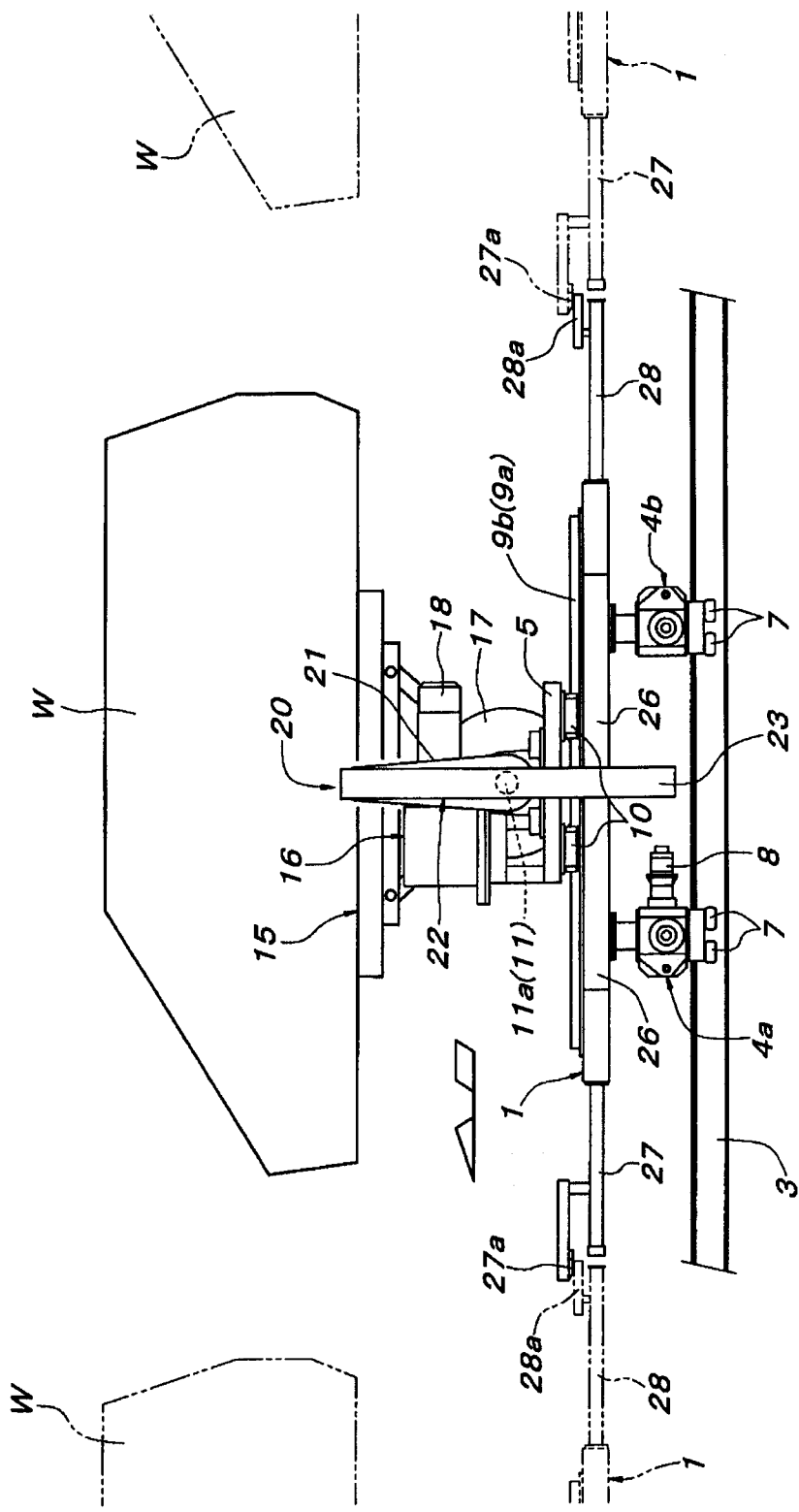
FIG. 3 is a side view except for a dip treatment bath.

Bars 27 and 28 extending by required lengths in the back and forth direction are protrudingly provided at front and rear ends of the conveying traveling body 1 respectively as shown in FIG. 2 and FIG. 3. A collision avoidance sensor 27a is attached to an upper side of a front end of the front bar 27, and a part to be detected 28a is attached to an upper side of a rear end of the rear bar 28. When the conveying traveling body 1 approaches a preceding conveying traveling body 1 traveling immediately therebefore, within a certain distance, the collision avoidance sensor 27a gets on the part to be detected 28a of the rear bar 28 of the preceding conveying traveling body 1 and then detects the part to be detected 28a. The following conveying traveling body 1 with the collision avoidance sensor 27a having detected the preceding conveying traveling body 1 is controlled to slow down and stop based on the detection signal, whereby the conveying traveling bodies 1 traveling adjacent back and forth can be prevented from abnormally approaching each other and a conveying traveling body 1 following the conveying traveling body 1 at a halt can automatically be stopped at a certain interval.

In the traveling type dipping apparatus thus configured, the vehicle body W which is a workpiece to be treated is supported horizontally above the rotation shaft 11 by the workpiece support 15 with a front end thereof oriented to the front side of the traveling direction as shown in FIG. 3. In this case, the revolving arm 21 is in a vertical upward posture, the elevating member (roller) 24 at the free end thereof is fitted to a position in the vicinity of the upper end of the guide rail 23, and the movable base 5 is at a home position which is in the substantially center of its back and forth reciprocating range.

Figure 6:
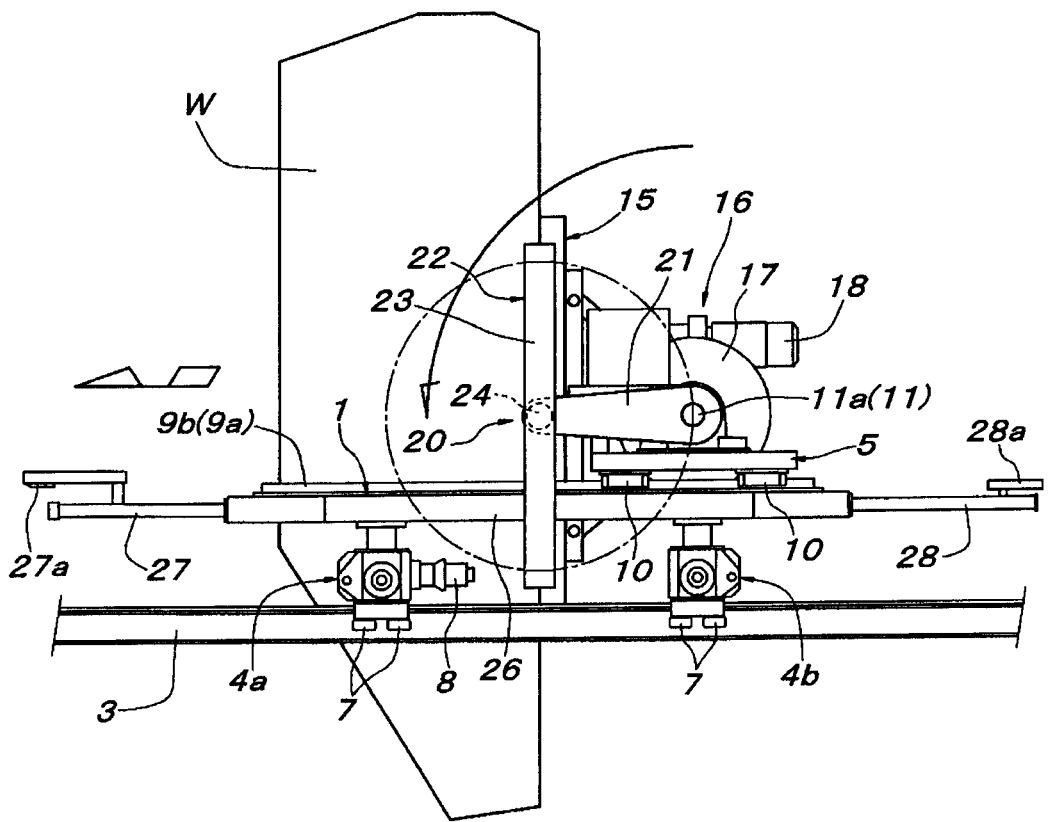
FIG. 6 is a side view showing a first stage of a vehicle body dipping process without the dip treatment bath.
Figure 7:
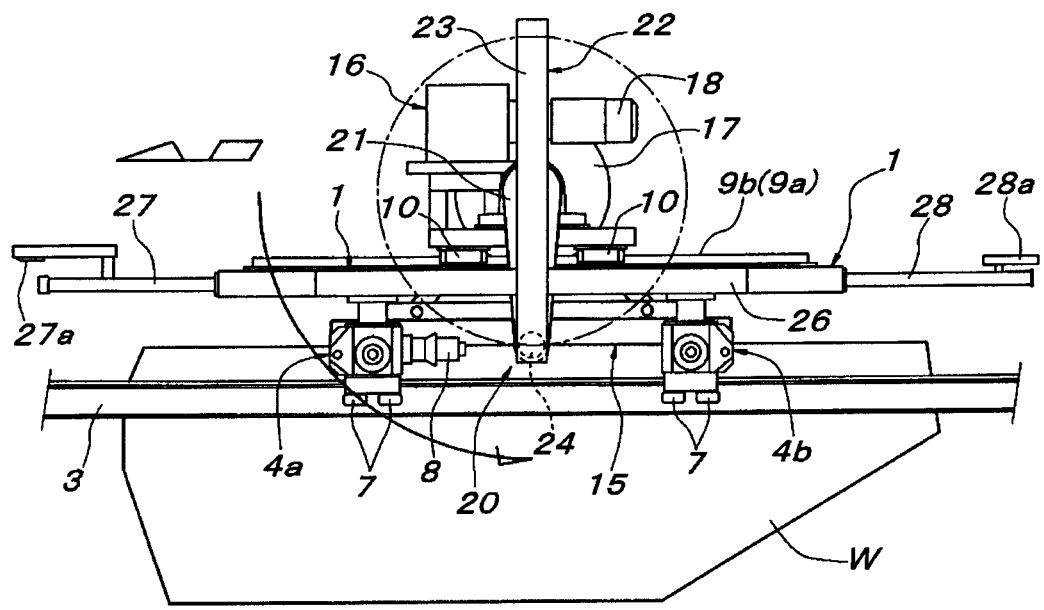
FIG. 7 is a side view showing a second stage of the vehicle body dipping process without the dip treatment bath.
Figure 8:
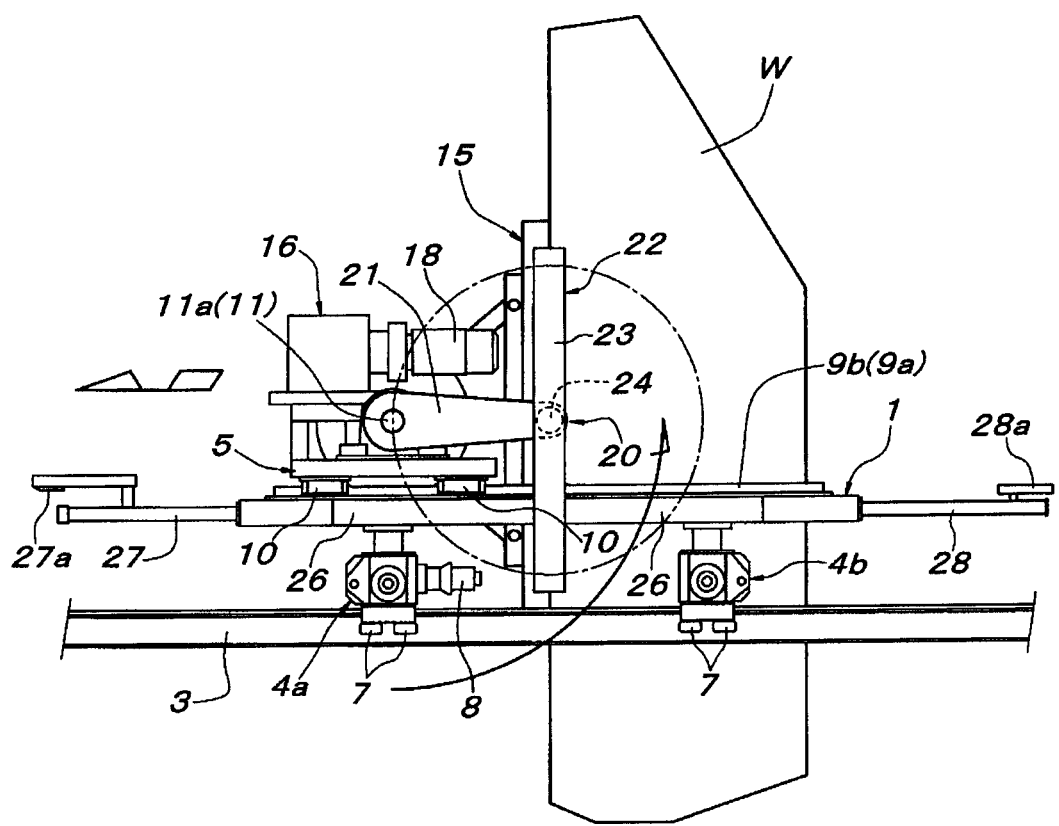
FIG. 8 is a side view showing a third stage of the vehicle body dipping process without the dip treatment bath.
Figure 9A:
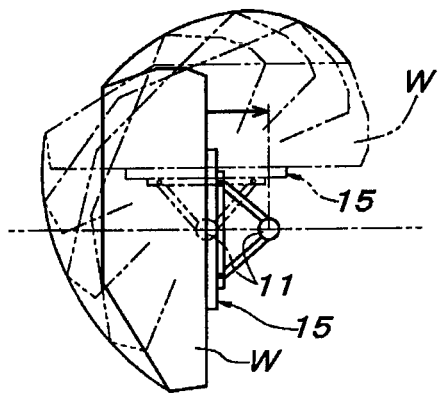
FIGS. 9A to 9D are schematic side views explaining rotation tracks of a vehicle body in the entire vehicle body dipping process.
Figure 9B:
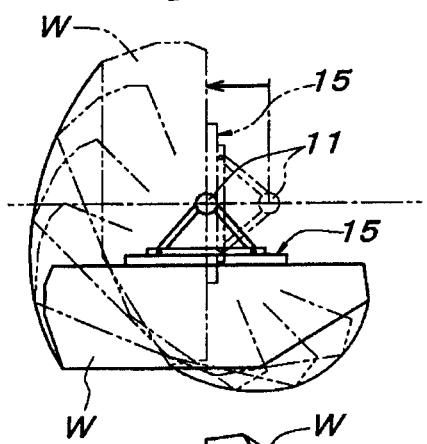
Figure 9C:
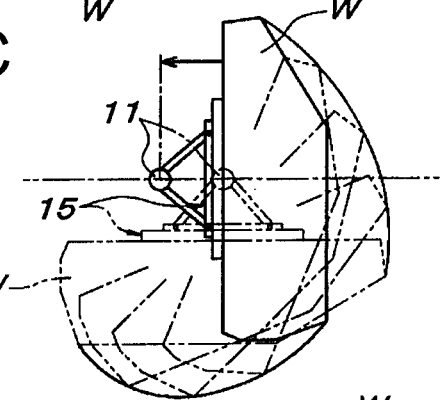
Figure 9D:
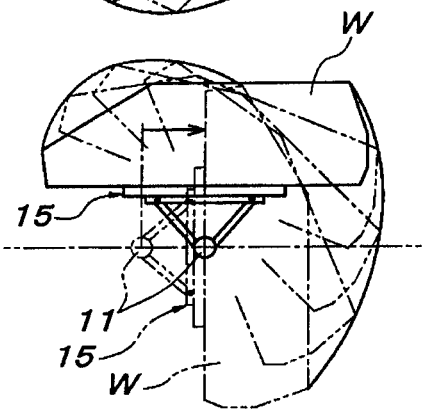

In this state, the speed reducer equipped motor 18 of the rotation shaft driving mechanism 16 is operated to rotate the rotation shaft 11 via the driving shaft 11a in such a direction that the vehicle body W rotates about the rotation shaft 11 with the front thereof lowered. Then, along with rotation of the revolving arm 21 which integrally rotates with the rotation shaft 11, the movable base 5 slides rearward while the elevating member 24 at the free end of the revolving arm 21 descends along the guide rail 23. When the rotation shaft 11 (revolving arm 21) turns 90 degrees, the movable base 5 reaches its retreat limit position and the vehicle body W takes an inverted downward posture, as shown in FIG. 6 (FIG. 9A). When the rotation shaft 11 (revolving arm 21) turns 180 degrees, the movable base 5 slides forward and returns to its original home position and the vehicle body W takes a flipped upside down posture, as shown in FIG. 7 (FIG. 9B). At this moment, the revolving arm 21 takes a vertical downward posture and the elevating member (roller) 24 at the free end thereof is fitted to a position in the vicinity of the lower end of the guide rail 23. Furthermore, when the rotation shaft 11 (revolving arm 21) turns 270 degrees, the movable base 5 slides forward from its home position and reaches its advance limit position and the vehicle body W takes an inverted upward posture, as shown in FIG. 8 (FIG. 9C). When the rotation shaft 11 (revolving arm 21) turns 360 degrees and completes one rotation, the movable base 5 slides rearward and returns to its home position and the vehicle body W takes the original horizontal forward-facing posture, as shown in FIG. 6 (FIG. 9D).

Figure 10A:
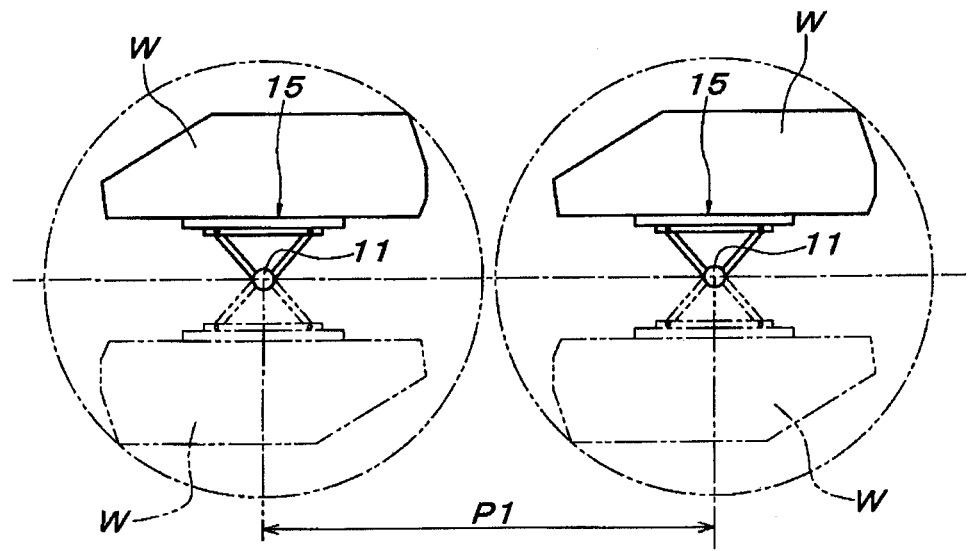
FIG. 10A is a schematic side view showing a rotation track of the vehicle body when a rotation shaft is not moved back and forth.
Figure 10B:
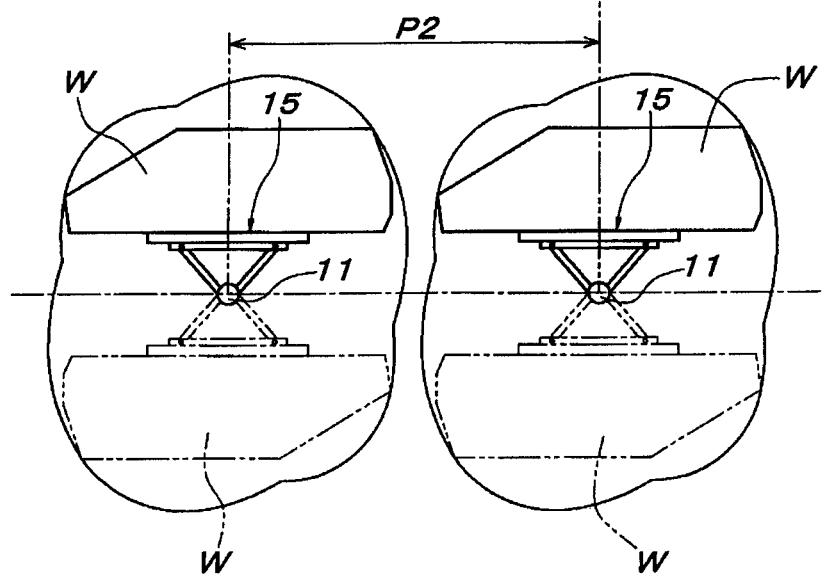
FIG. 10B is a schematic side view showing a rotation track of the vehicle body when the rotation shaft is moved back and forth.

When the rotation shaft 11 is caused to make a turn to rotate the vehicle body W about the rotation shaft 11 360 degrees as described above, the vehicle body W makes one back and forth reciprocating movement about the home position with respect to the conveying traveling body 1 together with the rotation shaft 11 in such a manner as to slide rearward when the front end thereof rotates downward and to slide forward when the front end thereof rotates upward. More specifically, as compared with the case where the rotation shaft 11 rotates at a fixed position without reciprocating back and forth with respect to the conveying traveling body 1 as shown in FIG. 10A, the rotation track at vehicle body positions most distant from the rotation shaft 11 becomes vertically long, and forward and rearward projections are kept small as shown in FIG. 10B. Accordingly, when a pitch between the conveying traveling bodies 1 is set so as to prevent the possibility that vehicle bodies W on adjacent conveying traveling bodies 1 come into contact with each other no matter what timing the vehicle bodies W rotate, in other words, so as for rotation tracks of the vehicle bodies W on respective conveying traveling bodies 1 not to overlap each other and to be apart while keeping a safety interval in front and rear, a pitch P2 between the conveying traveling bodies 1 can be reduced in the apparatus of the present invention as shown in FIG. 10B relative to a conventional pitch P1 between the conveying traveling bodies 1 as shown in FIG. 10A.

Figure 11A:
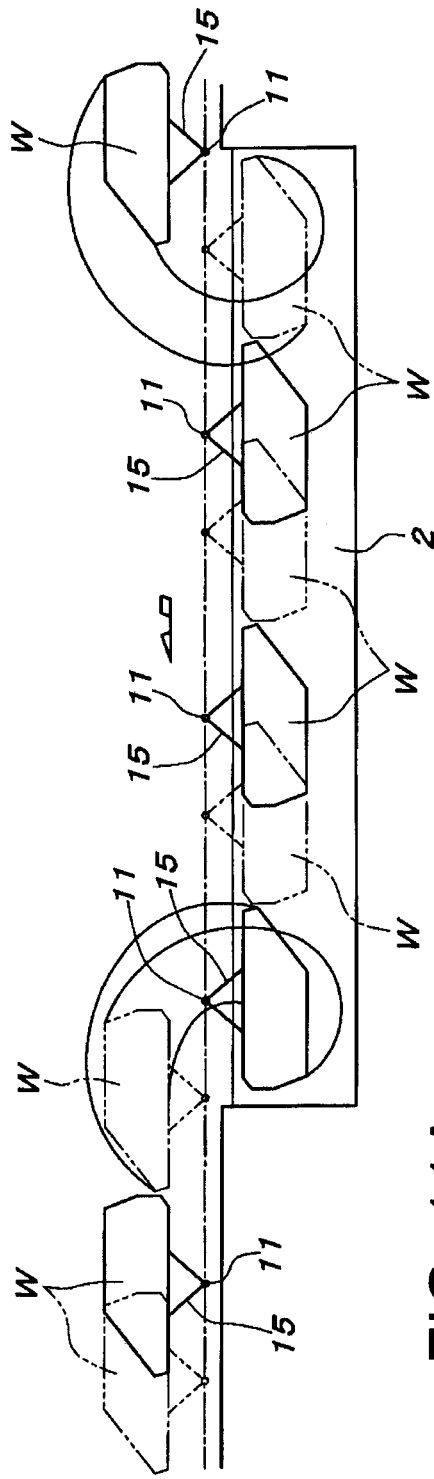
FIG. 11A is a schematic side view explaining a movement track of the vehicle body with respect to the dip treatment bath when the rotation shaft is not moved back and forth.
Figure 11B:
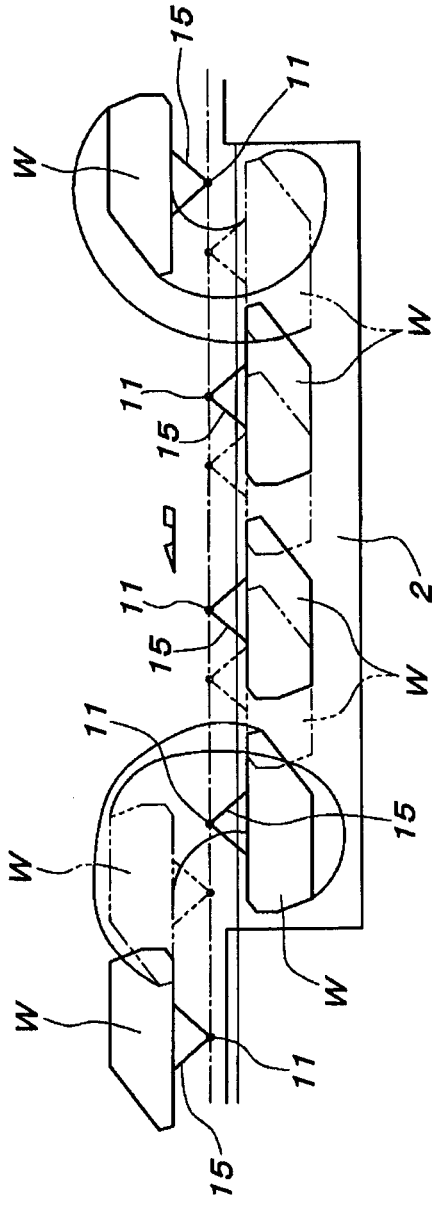
FIG. 11B is a schematic side view explaining a movement track of the vehicle body with respect to the dip treatment bath when the rotation shaft is moved back and forth.

As shown in FIG. 11, the conveying traveling body 1 supporting the vehicle body W horizontally in the forward facing direction above the rotation shaft 11 rotationally drives the rotation shaft 11 as described above from the moment of reaching the beginning at an upper region of the dip treatment bath 2 by its own traveling, whereby the vehicle body W moving forward integrally with the conveying traveling body 1 can be dipped in a treatment liquid within the dip treatment bath 2 during one rotation about the rotation shaft 11. When the traveling type dipping apparatus is configured by setting the length of the dip treatment bath 2 in such a manner, as shown for example, that the vehicle body W rotates downward at the beginning of the dip treatment bath 2 and the dipping is started, that the vehicle body W advances in the flipped upside down posture about 2.5 as much as the pitch between the conveying traveling bodies 1 as shown in FIG. 7 (FIG. 9B), and that the vehicle body W having been dipped rotates upward from the end of the dip treatment bath 2 and comes out of the treatment liquid, an entire length of the dip treatment bath 2 required when conveying traveling bodies 1 continuously travel at the short pitch P2 can be shortened relative to an entire length of the dip treatment bath 2 required when the conveying traveling bodies 1 continuously travel at the conventional pitch P1 as shown in FIG. 11A since the pitch P2 between the conveying traveling bodies 1 can be reduced as described above. It is noted that a duration when the vehicle body W is dipped in the treatment liquid becomes short in the configuration of using the dip treatment bath 2 with the short entire length if the traveling speeds of the conveying traveling bodies 1 are the same. Thus, to make the duration of the vehicle body W dipped in the treatment liquid as long as the conventional one, the traveling speed of the conveying traveling bodies 1 has only to be slower.

Figure 12:
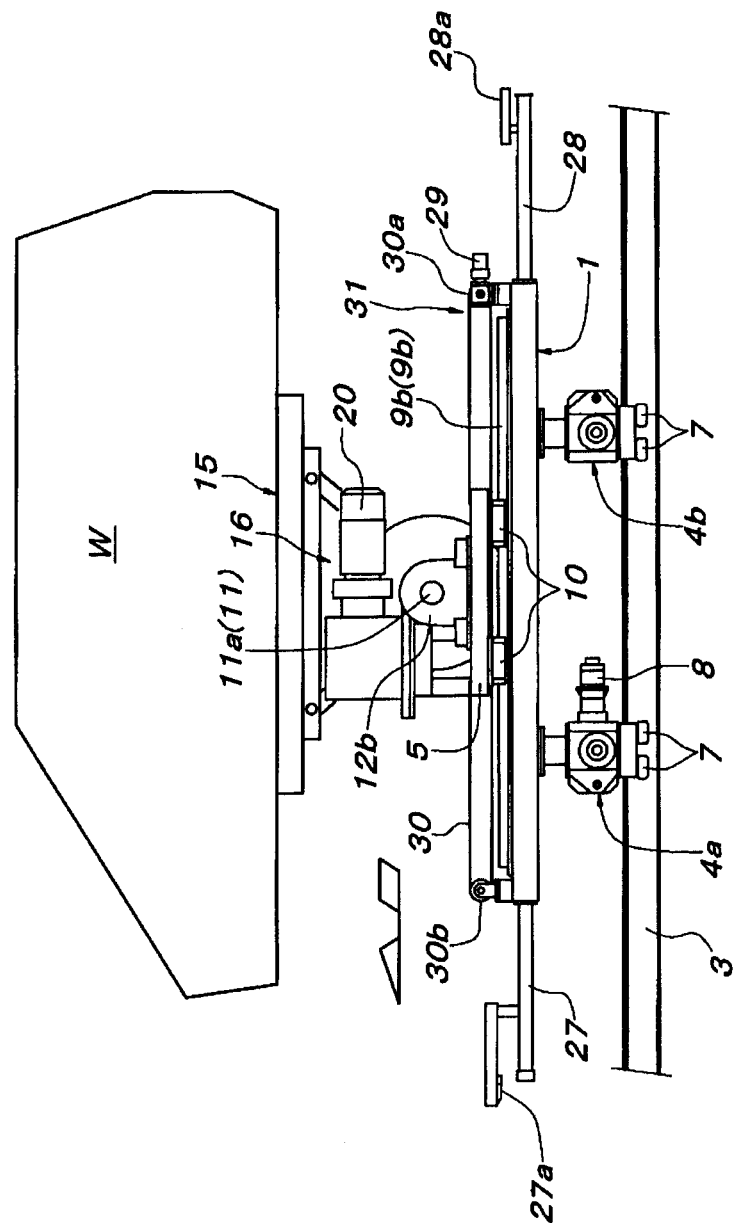
FIG. 12 is a side view showing another embodiment of the present invention, except for the dip treatment bath.

In the above-described embodiment, the movable base 5 supporting the rotation shaft 11 is configured to be moved back and forth by using a rotational force of the rotation shaft 11 (a rotational driving force of the rotation shaft driving mechanism 16). However, as shown in FIG. 12, the movable base 5 can be made to reciprocate back and forth also by movable base driving mechanism 31 provided with a driving rotating body 30 driven by another motor 29 separate from the speed reducer equipped motor 18 of the rotation shaft driving mechanism 16. In the embodiment as shown in FIG. 12, the driving rotating body 30 employs a stretch rotating body (such as a chain, a belt, or a wire rope) stretched between a rotating body (such as a toothed wheel or a pulley) 30a pivotally supported at one of the outside both ends of the back and forth reciprocating path of the movable base 5 and rotationally driven by the motor 29 and a rotating body (such as a toothed wheel or a pulley) 30b pivotally supported at the other outside end of the back and forth reciprocating path of the movable base 5, the stretch rotating body having a part engaged with the movable base 5. A pinion gear which is pivotally supported on the movable base 5 so as to be meshed with a rack gear laid on the conveying traveling body 1 along the back and forth reciprocating path of the movable base 5 and is motor-driven can also be used as the driving rotating body. Furthermore, in the case of movable base driving mechanism using these rack gear and pinion gear, the pinion gear can pivotally be supported at a fixed position on the conveying traveling body 1 and the rack gear can be fixed at the movable base 5.

When the above-described movable base driving mechanism 31 is used, the motor 29 is controlled to achieve shifting the movement direction of the movable base 5 and changing the speed along with changes in rotation angle of the rotation shaft 11 in the same manner as when the movable base 5 is made to reciprocate back and forth by using the movable base driving mechanism 20 of the above-described embodiment. By this, when the vehicle body W is caused to make a turn about the rotation shaft 11 by rotation of the rotation shaft 11, the vehicle body W makes one back and forth reciprocating movement about the home position with respect to the conveying traveling body 1 together with the rotation shaft 11 in such a manner as to slide rearward when the front end thereof rotates downward and to slide forward when the front end thereof rotates upward, as shown in FIG. 9. The rotation track at vehicle body positions most distant from the rotation shaft 11 becomes vertically long, and forward and rearward projections can be kept small as shown in FIG. 10B.

The configuration of the conveying traveling body 1 is not restricted to the above-described embodiment. For example, the guide roller 13 pivotally supported at the free end of the rotation shaft 11 is supported by the guide rail 14 in order that the rotation shaft 11 has both ends supported in the above embodiment. However, the conveying traveling body 1 may be configured by providing a carriage which travels as engaged with the guide rail 14 to support the free end of the rotation shaft 11 on the carriage by a bearing. Further, the rotation shaft 11 can be supported only on the side of the conveying traveling body in a cantilevered fashion, depending on the configuration of the conveying traveling body.

Figure 13:
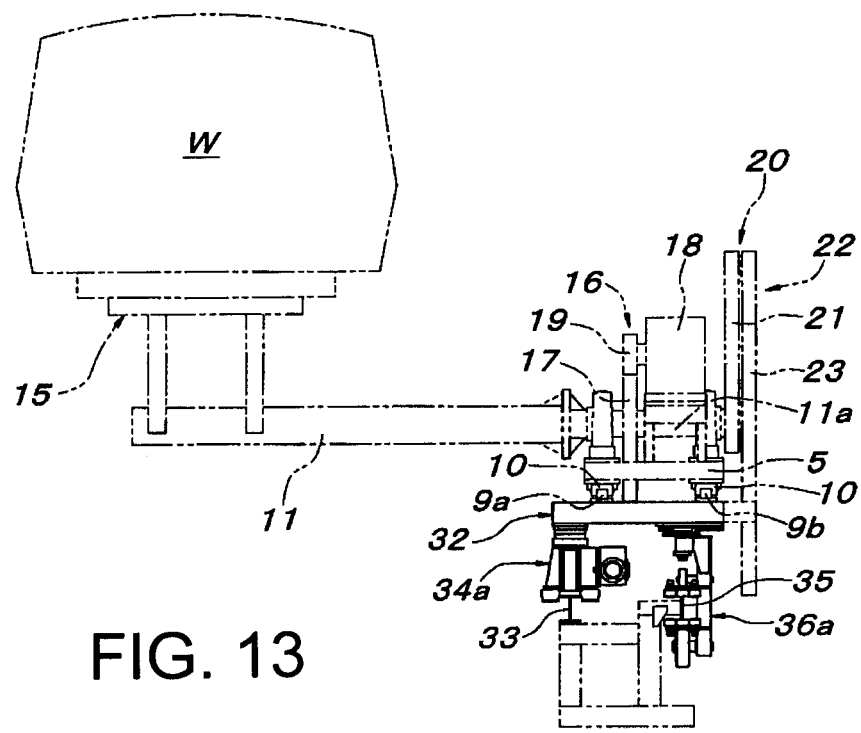
FIG. 13 is a front view of a main part showing a modification of a conveying traveling body in the one embodiment of the present invention.
Figure 14:
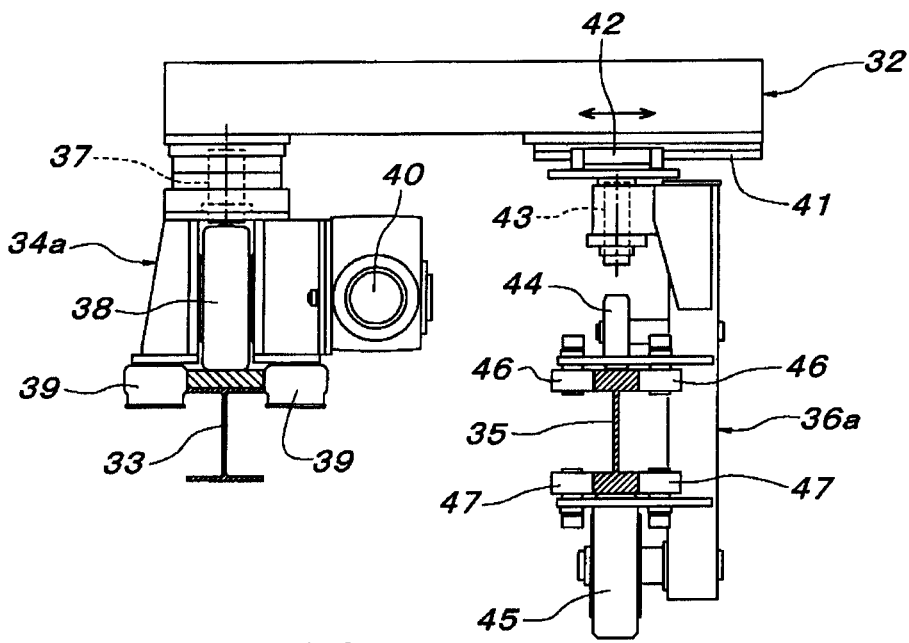
FIG. 14 is an enlarged front view of the above modified conveying traveling body.
Figure 15:
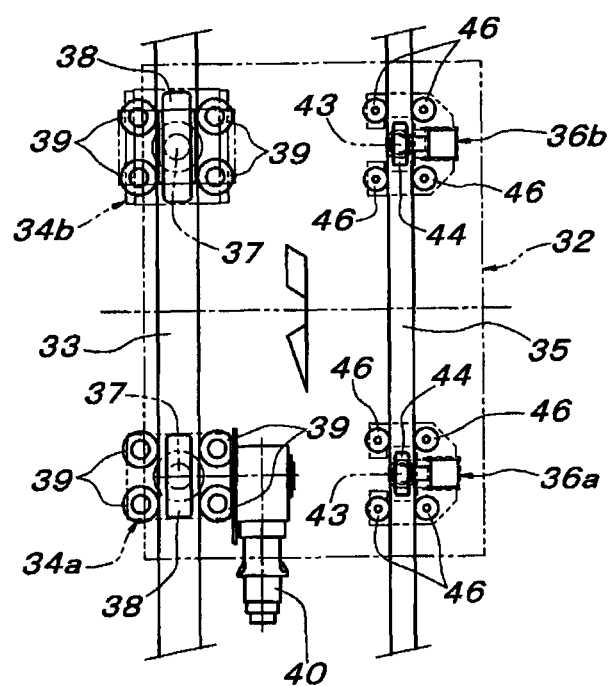
FIG. 15 is a plan view of a main part of the above modified conveying traveling body.

FIGS. 13 to 15 illustrate an example of a conveying traveling body 32 supporting the rotation shaft 11 in a cantilevered fashion. The conveying traveling body 32 includes a pair of front and rear carriages 34a and 34b engagedly supported on a first guide rail 33 located inside (the side nearer to the dip treatment bath) and a pair of front and rear carriages 36a and 36b engagedly supported on a second guide rail 35 located outside. The inside paired front and rear carriages 34a and 34b are supported on the bottom of the conveying traveling body 32 rotatably about a vertical spindle 37 respectively and include a supporting wheel 38 rolling on an upper horizontal rail of the first guide rail 33 and a pair of right and left posture controlling rollers 39 at the front and the rear thereof sandwiching the first guide rail 33 and being rotatable about the vertical axis. The front carriage 34a is provided with a speed reducer equipped motor 40 rotationally driving the supporting wheel 38 thereof. The outside carriages 36a and 36b are supported rotatably about a vertical spindle 43 respectively, on a pair of front and rear lateral moving bases 42 provided laterally movably on the bottom of the conveying traveling body 32 via a slide guide rail 41. The carriages 36a and 36b respectively include a supporting wheel 44 rolling on an upper horizontal rail of the second guide rail 35, a backup wheel 45 abutting and rolling against the underside of a lower horizontal rail of the second guide rail 35, a pair of right and left posture controlling rollers 46 at the front and the rear thereof sandwiching the upper horizontal rail of the second guide rail 35 and being rotatable about the vertical axis, and a pair of right and left posture controlling rollers 47 at the front and the rear thereof sandwiching the lower horizontal rail of the second guide rail 35 and being rotatable about the vertical axis.

Although supported by the first and second guide rails 33 and 35 stably and independently, the conveying traveling body 32 thus configured can travel smoothly even on a horizontal curve portion of the path where the first and second guide rails 33 and 35 curve horizontally, since all carriages 34a, 34b, 36a, and 36b are rotatable about the vertical spindles 37 and 43 and the outside carriages 36a and 36b are laterally movable by the lateral moving bases 42. Accordingly, the rotation shaft 11 can be supported in a cantilevered fashion on the movable base 5 supported on the conveying traveling body 32 via the slide guide rails 9a and 9b and slide guides 10 as in the above-described embodiment. An overturning moment which acts upon the conveying traveling body 32 by the weight of the vehicle body W exerting on the rotation shaft 11 at that time and has a contact between the first guide rail 33 and the supporting wheels 38 of the inner carriages 34a and 34b serving as a supporting point is received by the second guide rail 35 via the backup wheels 45 of the outside carriages 36a and 36b, whereupon the rotation shaft 11 can move integrally with the conveying traveling body 32 while maintaining the horizontal posture.

The traveling type dipping apparatus of the present invention can be utilized in a painting system of a vehicle body of an automobile as mechanism to rotate and dip the vehicle body having been supported on the conveying traveling body horizontally in the forward facing direction in a treatment liquid while conveying the vehicle body.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A conveying apparatus for dipping workpieces along a traveling path into a dip treatment bath, said conveying apparatus comprising:
   a conveying traveling body traveling along the dip treatment bath;
   a rotation shaft provided to said conveying traveling body and crossing above the dip treatment bath horizontally and crossing above the dip treatment bath horizontally and perpendicular to a traveling direction of said conveying traveling body;
   a rotation shaft driving mechanism provided to said conveying traveling body and rotationally driving said rotation shaft;
   a workpiece support provided to said rotation shaft wherein a workpiece to be treated having been supported by said workpiece support is configured to be dipped in the dip treatment bath by rotation of said rotation shaft;
   a movable base provided on said conveying traveling body, configured to reciprocate in a direction parallel to said traveling direction of said conveying traveling body, and supporting said rotation shaft; and
   a movable base driving mechanism to make said movable base reciprocate back and forth with respect to said conveying traveling body.

2. The conveying apparatus according to claim 1, wherein said movable base driving mechanism comprises a revolving arm supported on said movable base and rotating about a horizontal axis parallel to said rotation shaft in synchronization with said rotation shaft, and a rotation to rectilinear reciprocation converting mechanism to convert one rotational movement of said revolving arm into one reciprocal movement of said movable base with respect to said conveying traveling body.

3. The conveying apparatus according to claim 2, wherein said revolving arm has a free end, and said rotation to rectilinear reciprocation converting mechanism comprises a guide rail mounted to said conveying traveling body in a vertical up/down direction so as to adjoin said revolving arm and an elevating member attached to said free end of said revolving arm and elevatably engaged with said guide rail.

4. The conveying apparatus according to claim 1, wherein said movable base driving mechanism is provided with a driving rotating body driven by another motor separate from a motor of said rotation shaft driving mechanism.

* * * * *

UNITED STATES PATENT AND TRADEMARK OFFICE
CERTIFICATE OF CORRECTION

| | |
|---|---|
| PATENT NO. | : 8,590,482 B2 |
| APPLICATION NO. | : 13/175141 |
| DATED | : November 26, 2013 |
| INVENTOR(S) | : Shigeyoshi Nishihara and Hirohito Takeichi |

It is certified that error appears in the above-identified patent and that said Letters Patent is hereby corrected as shown below:

In The Claims:

Column 9, Line 40, should read as follows: -- and --

Signed and Sealed this
Twenty-fifth Day of March, 2014

Michelle K. Lee
*Deputy Director of the United States Patent and Trademark Office*